United States Patent [19]

Schneider et al.

[11] Patent Number: 4,669,058

[45] Date of Patent: May 26, 1987

[54] INTEGRAL CONTROL OF A DEPENDENT VARIABLE IN A SYSTEM HAVING AT LEAST TWO INDEPENDENT VARIABLES WHICH INFLUENCE THE DEPENDENT VARIABLE

[75] Inventors: Roy W. Schneider, Ellington; Mark L. Harris, Enfield, both of Conn.

[73] Assignee: United Technologies Corporation, Hartford, Conn.

[21] Appl. No.: 781,549

[22] Filed: Sep. 30, 1985

[51] Int. Cl.$^4$ .................. G05B 13/02; G05B 13/04; G05B 13/00

[52] U.S. Cl. .................. 364/148; 364/150; 364/157; 364/161; 364/182; 364/152; 318/561

[58] Field of Search .......... 364/148, 149, 150, 152, 364/157, 153, 160, 161, 162, 163, 181, 182; 318/561, 610, 616, 617

[56] References Cited

U.S. PATENT DOCUMENTS

| | | | |
|---|---|---|---|
| 4,275,439 | 6/1981 | Kuwata | 364/152 |
| 4,423,594 | 1/1984 | Ellis | 364/149 X |
| 4,437,045 | 3/1984 | Mitsuoka | 364/148 X |
| 4,498,036 | 2/1985 | Salemka | 364/157 X |
| 4,509,110 | 4/1985 | Levesque et al. | 364/150 X |
| 4,546,426 | 10/1985 | Häfner et al. | 364/149 X |

Primary Examiner—Jerry Smith
Assistant Examiner—Jon D. Grossman
Attorney, Agent, or Firm—Francis J. Maguire, Jr.

[57] ABSTRACT

A method and apparatus for integral control of a dependent variable in a system having at least two independent variables which influence the dependent variable is disclosed. A difference signal indicative of the difference between the sensed dependent variable and a reference is integrated and provided to a hysteresis transfer function. The output of the transfer function is subtracted from the integrated difference signal and the resulting signal is used to control an independent variable which thereby influences the dependent variable only for small magnitude signal variations in the integrated signal. The integrated signal is used to control another independent variable for large magnitude signal variations in the integrated signal. The other independent variable is typically only capable of influencing the dependent variable for large magnitude signal variations.

4 Claims, 1 Drawing Figure

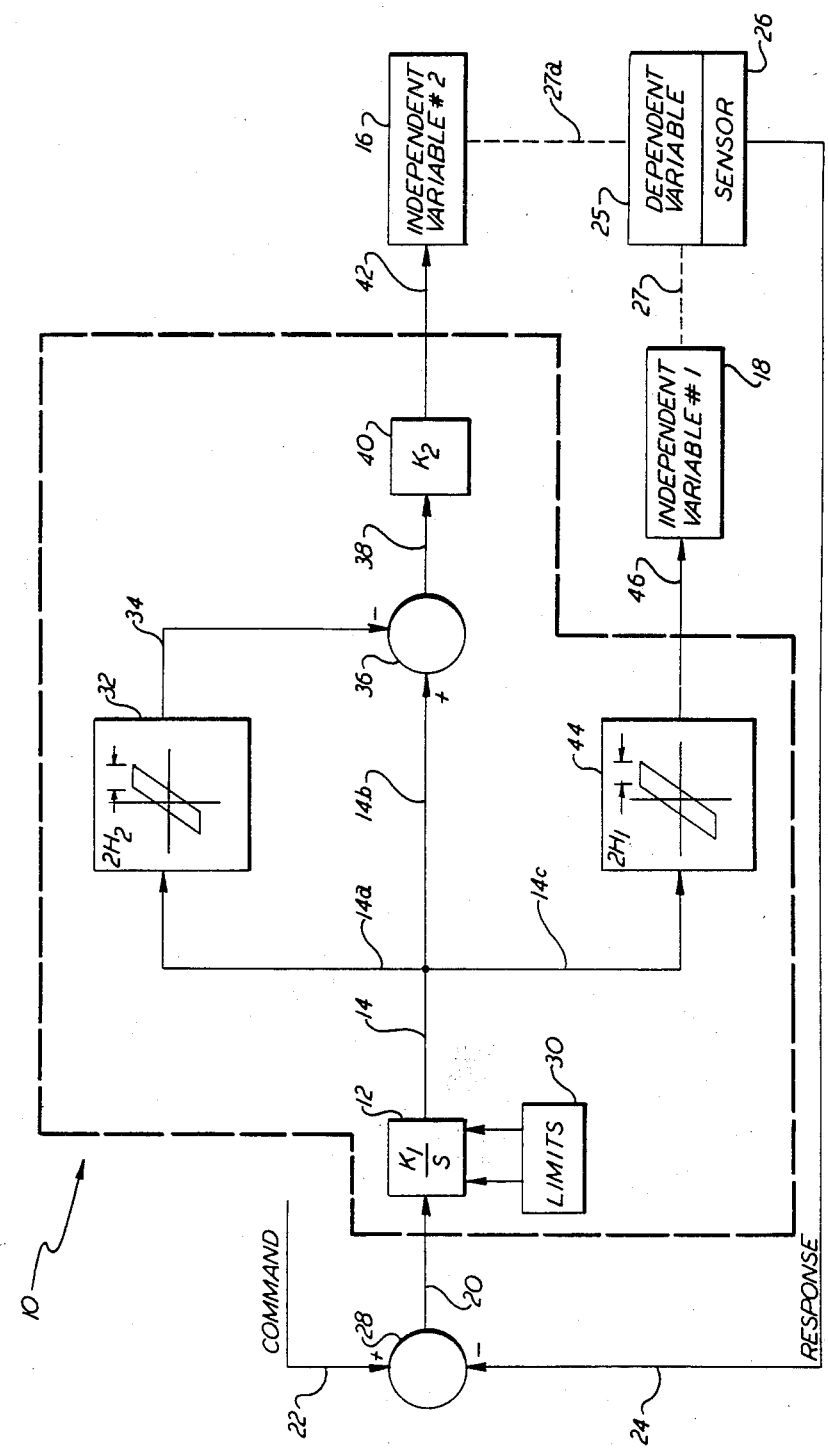

INTEGRAL CONTROL OF A DEPENDENT VARIABLE IN A SYSTEM HAVING AT LEAST TWO INDEPENDENT VARIABLES WHICH INFLUENCE THE DEPENDENT VARIABLE

CROSS REFERENCE TO RELATED APPLICATION

The invention described herein may employ some of the teachings disclosed and claimed in a commonly owned copending application file on even date herewith by Harner et al., (U.S. Ser. No. 781,585), entitled IMPROVED PROPELLER SYNCHROPHASER CONCEPT, which is hereby expressly incorporated by reference.

TECHNICAL FIELD

This invention relates to automatic control systems, and in particular to controlling a dependent variable by modulating two independent variables of the controlled system.

BACKGROUND ART

In an automatic control system, the control is utilized to modulate some system characteristic (called an independent variable) to achieve some desired other system characteristic (called a dependent variable). In other words, the automatic control system will modulate the independent variable to achieve a desired characteristic of the dependent variable. For example, if an automatic control modulates engine fuel flow to achieve a desired engine speed, then engine fuel flow is the system independent variable and engine speed is the dependent variable.

There often exists more than one independent variable capable of influencing any one dependent variable in a system. In such systems, it may be beneficial to use the multiple independent variables to achieve a desired characteristic of one dependent variable. The prior art typical automatic control includes an integral control which may comprise a simple integral control, or a proportional-plus-integral control, or a proportional-plus-integral-plus-derivative control. The integral portion of the control typically integrates the difference between the desired and actual dependent variable. The integrated result is used to modulate the independent variable. Thus, in concept, the one dependent variable desired characteristic could be achieved by simultaneously utilizing a combination of separate integral controls for modulation of each independent variable. However, it is well known in the prior art that simultaneously active multiple integral controls, each integrating the same dependent variable error, will cause a control problem, i.e., the multiple integrators, each modulating a separate independent variable, will fight each other in an attempt by each integrator to achieve a zero-error of the dependent variable. Therefore, it is an accepted practice in the prior art that any one dependent variable will not simultaneously utilize more than one integral in the automatic control, even though the automatic control may utilize various combinations of proportional and derivative control to modulate additional independent variables. This implies that the one integral control will modulate only one independent variable.

DISCLOSURE OF THE INVENTION

The object of the present invention is to provide a method and apparatus by which one integral control may be used to modulate at least two independent variables to achieve a desired characteristic of one dependent variable.

According to the present invention, a method and apparatus for providing only one integral control path for modulating at least two independent variables is provided such that one independent variable is only responsive to large variations of integrator output and another independent variable is only responsive to small variations of integrator output which, in combination, achieve a desired characteristic in one dependent variable.

The result of this invention is that one independent variable (responsive to large variations in integrator output) can be utilized in an automatic control to bring the dependent variable near to the desired characteristic, whereas another independent variable (responsive to small variations in integrator output) can be utilized to fine-tune the dependent variable to the desired characteristic.

The benefit of such an automatic control should be apparent. For example, one independent variable may have the capability for a large influence on the dependent variable but be unable to accurately produce a small change in the dependent variable. Another independent variable may be capable of only a very small range of modulation and influence on the dependent variable while at the same time being capable of causing very accurate small variations in the dependent variable. This invention utilizes the first independent variable to be responsive to large variations of the integrator output, and the second independent variable to be responsive to small variations of the integrator output. As another example, the device utilized to modulate one independent variable (e.g., an actuator) may possess an undesirable small-signal nonlinearity (e.g., hysteresis) such that the independent variable is not responsive to minor variations in integrator output and consequently cannot accurately provide small variations in the dependent variable. A second independent variable is modulated to fine-tune the dependent variable while the device utilized to modulate the first independent variable remains within its hysteresis band and is unable to modulate the first independent variable. These two examples should be sufficient to show that a variety of automatic control systems will benefit from use of this invention.

Whereas in the prior art it was sometimes conceived as advantageous to simultaneously use active multiple integral controls to modulate two independent variables which combine to achieve a desired characteristic of a dependent variable, this concept was known to cause the problem of separate integrators fighting each other by each modulating an independent variable to achieve a "zero-error" of the single dependent variable. The resulting accepted practice of only using one integral in the automatic control of any one dependent variable is overcome by the present invention which defines a method by which one integral control can modulate two independent variables which combine to achieve the desired characteristic of the one dependent variable. This method allows one independent variable to be responsive only to large variations of integrator output and the other independent variable to be responsive only to small variations of integrator output. The result is that one independent variable (responsive to large integrator output variation) will control the dependent variable near to the desired characteristic while the other independent variable (responsive to small integrator output variation) will "fine-tune" the dependent variable to the desired characteristic.

These and other objects, features and advantages of the present invention will become more apparent in light of the detailed description of a best mode embodiment thereof, as illustrated in the accompanying drawing.

BRIEF DESCRIPTION OF THE DRAWING

The drawing consists of one FIGURE which is a simplified schematic block diagram illustration of an amplitude dependent dual integration limiting circuit, according to the present invention.

BEST MODE FOR CARRYING OUT THE INVENTION

The FIGURE shows a simplified schematic block diagram illustration of an amplitude dependent dual integration limiting circuit 10, according to the present invention. According to this invention, a single integrator 12 output signal on a line 14 is separated into three lines 14a, 14b, 14c, two of which 14a, 14b are utilized to modulate one independent variable 16 and the third of which 14c is utilized to modulate another independent variable 18.

An integrator input signal on a line 20, is typically the difference between a reference or command signal on a line 22 and a sensed signal value on a line 24, representing the response of a dependent variable 25 as sensed by a sensor 26. The dependent variable is influenced by the independent variables as indicated by dashed lines 27, 27a. A junction 28 performs the subtraction operation and provides the difference signal on the line 20. The integrator 12 has a magnitude boundary imposed by a limit circuit 30 which establishes maximum and minimum limits on the excursions of the integrated signal on the line 14. The signal on the line 14 is split into three lines 14a, 14b, and 14c, each having the same bounded output signal thereon as is found on line 14. The signal on line 14a is provided to a hysteresis transfer function 32 which provides a hysteresis output signal on a line 34 which is then subtracted in a junction 36 from the signal on the line 14b. A resulting signal on a line 38 is provided to a proportional gain 40 having a gain magnitude $K_2$ which multiplies the magnitude of the signal on the line 38 by the value $K_2$ and provides an output signal on a line 42 for controlling independent variable #2. The signal on line 14c is input to another hysteresis transfer function 44 which provides an output signal on a line 46 for controlling independent variable #1.

The integral gains and authority limits of the two output paths can be individually selected. The integral gain from the input signal on line 20 to the output signal on the line 46 is equal to the integrator 12 gain value $K_1$. The integral gain from the input signal on the line 20 to the output signal on the line 42 is equal to the integrator 12 gain value $K_1$ multiplied by the gain 40 magnitude $K_2$. The authority limits on the output signal on the line 46 are achieved by bounding the integrator 12 with maximum and minimum limits 30. The output signal on the line 42 authority maximum limit is the hysteresis band magnitude of the transfer function 32 multiplied by the gain 40 magnitude $K_2$. The output signal on the line 42 signal authority minimum limit is of the same magnitude as the maximum authority but negative in sign. The output signal on the line 46 is only responsive to large variations in the integrator output signal on the line 14. The threshold where the output signal on the line 46 is responsive to the integrator output on line 14 is determined by the hysteresis band magnitude of the transfer function 44.

It should be noted that although the hysteresis transfer function 44 is shown as part of the apparatus 10 shown in the FIGURE, it may instead be inherent in the system (e.g., incorporated in independent variable #1 as actuator hysteresis). In other words, in some applications the transfer function 44 will not be made part of the circuit 10 shown in the FIGURE and the signal on line 14c is considered to be one and the same as the output signal on the line 46.

Three characteristics which define the hysteresis transfer functions 32, 44 may be summarized as follows: First, the hysteresis transfer function output signal remains invariant whenever the absolute value of the difference between its input and output signals is no larger than the hysteresis band magnitude; second, an increasing value input signal that would cause the difference of the input signal minus hysteresis magnitude to be more than the output signal results in a change in output signal such that the output signal is equal to the input signal minus hysteresis magnitude; third, a decreasing value input signal that would cause the sum of the input signal plus hysteresis magnitude to be less than the output signal will result in a change in output signal such that the output signal is equal to the input signal plus hysteresis magnitude.

As an example of these three hysteresis characteristics, assume a hysteresis band magnitude of six and an initial output signal magnitude of 100. Then, according to the first characteristic, the hysteresis output signal would remain invariant at 100 for any variation of input signal within the range of 94–106. According to the second characteristic, if the input signal increases to more than 106, then the output signal increases to six less than the input signal so that an input signal which increases to 120 results in an output signal of 114. According to the third characteristic, if the input signal decreases to less than 94, then the output signal decreases to six more than the input signal so that an input signal which decreases to 50 results in an output signal of 56. Continuing from the point where the input signal decreased to 50 and output signal decreased to 56, according to the first characteristic, the output remains invariant at 56 for any variation of input signal in the range from 50 to 62 (i.e., 56 minus six and 56 plus six).

Thus, referring back to the drawing, as the integrator 12 output signal on the line 14 increases in one direction, the signal on line 34 will remain unchanged until the signal on line 14a increases by an amount greater than the hysteresis band ($H_2$) and then will increase at the same rate as the signal on line 14a. Since the signal on line 38 is the signal on line 34 subtracted from the signal on line 14b, it increases at the same rate as the signal on line 14b until the signal on line 34 begins to increase, thereby causing the signal on line 38 to remain at a constant value equal to the amount of hysteresis ($H_2$). As the signals on lines 14a, 14b, 14c increase in one direction, the output signal on the line 46 remains unchanged until the signal on line 14c increases by an amount greater than the hysteresis transfer function 44 band magnitude $H_1$. Then it will increase at the same rate as the signal on line 14c. The magnitude of the total hysteresis band, 2H$_2$, is less than the magnitude of 2H$_1$. Therefore, a comparison of the output signal on the line 46 and the output signal on the line 42 will show that the output signal on line 42 increases as the signal on line 14b increases while the output siqnal on line 46 remains unchanqed. However, after the output signal on line 42 stops increasing, due to the subtraction of the signal on line 34 from the signal on line 14b, then the output signal on line 46 begins to increase as the signal on line 14c continues to increase because the signal on line 14c has increased by an amount greater than the hysteresis band of the hysteresis transfer function 44. This means that control has changed from the path containing the output signal on the line 42 initially to the path containing the output signal on the line 46 subsequently. As the signals on lines 14a, 14b, and 14c change direction and begin to decrease, the signal on the line 42 begins to decrease at the same time because the signal on line 34 remains constant due to the hysteresis effect of the transfer function 32. At the same time, the output signal on the line 46 remains constant due to the hysteresis transfer function 44. Therefore, control is switched from the output signal on the line 46 to the output signal on the line 42 when the signals on lines 14a, 14b, 14c change direction. Thus, if the signal variations on lines 14a, 14b, 14c are much larger than the total hysteresis magnitude 2H$_1$, then control is essentially determined by the output signal on the line 46. However, if the signal variations on lines 14a, 14b, and 14c are smaller than the total hysteresis magnitude 2H$_2$, then the output signal on the line 42 will have sole control while the output signal on the line 46 remains constant. Thus, the output signal on the line 42 acts as a small amplitude signal integrator limited by the total hysteresis magnitude 2H$_2$ and the output signal on the line 46 acts as a large amplitude signal integrator limited by the integrator limits 30.

The above described apparatus defines a method by which one integral control can modulate two independent variables which combine to achieve the desired characteristic of one dependent variable. This method allows one independent variable to be responsive only to large variations of integrator output and the other independent variable to be responsive only to small variations of integrator output. The result is that one independent variable (responsive to large integrator output variations) will control the dependent variable near to the desired characteristic while the other independent variable (responsive to small integrator output variations) will "fine-tune" the dependent variable to the desired characteristic.

Of course, it will be understood by those skilled in the art, that the above described apparatus and method may be implemented using either analog or digital hardware. Similarly, it will also be understood that the method and apparatus of the present invention may be implemented on a general purpose digital computer using logical steps dictated by the teachings of the methods described herein.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method for providing integral control of a dependent variable in a system having at least two independent variables which influence the dependent variable, comprising the steps of:
   integrating a difference signal having a magnitude indicative of the difference between a dependent variable command signal and a dependent variable sensed signal and providing an integrated error signal for controlling a first independent variable which is only responsive to large magnitude variations of the integrated error signal; and
   subtracting from the integrated error signal a hysteresis signal having a magnitude which remains invariant whenever the absolute value of the difference between the magnitudes of the integrated error signal and the hysteresis signal is no larger than the magnitude of a selected hysteresis band, and which is equal in magnitude to the integrated error signal magnitude minus the selected hysteresis band magnitude whenever an increasing integrated error signal magnitude causes the difference between the integrated error signal magnitude and the hysteresis band magnitude to be greater than the hysteresis signal magnitude, and which is equal in magnitude to the integrated error signal magnitude plus the selected hysteresis band magnitude whenever a decreasing integrated error signal magnitude causes the sum of the integrated error signal magnitude and the hysteresis band magnitude to be less than the magnitude of the hysteresis signal, and providing a hysteresis limited integrated error signal as an output signal for controlling a second independent variable which is thereby limited in responsiveness to small signal variations of the integrated error signal.

2. The method of claim 1, wherein the first independent variable is made only responsive to large signal variations of the integrated error signal by providing a modified integrated error signal which remains invariant whenever the absolute value of the difference between the integrated error signal and the modified integrated error signal is no larger than a chosen hysteresis band (larger than the selected hysteresis band), and which is equal to the integrated error signal magnitude minus the chosen hysteresis band magnitude whenever an increasing integrated error signal magnitude causes the difference between the integrated error signal magnitude and the chosen hysteresis band magnitude to be greater than the modified integrated error signal magnitude, and which is equal to the first output signal magnitude plus the chosen hysteresis band magnitude whenever a decreasing integrated error signal magnitude causes the sum of the integrated error signal magnitude and the chosen hysteresis band magnitude to be less than the modified integrated error signal magnitude.

3. Apparatus for providing integral control of a dependent variable in a system having at least two independent variables which influence the dependent variable, comprising:
   an integrator, responsive to a difference signal having a magnitude indicative of the difference between a dependent variable command signal and a dependent variable sensed signal and providing an integrated error signal for controlling a first independent variable which is only responsive to large magnitude variations of the integrated error signal;
   a hysteresis transfer function, responsive to the integrated error signal for providing a hysteresis signal having a magnitude which remains invariant whenever the absolute value of the difference between the magnitudes of the integrated error signal and the hysteresis signal is no larger than the magnitude of a selected hysteresis band, and which is equal to the integrated error signal magnitude minus the selected hysteresis band magnitude whenever an increasing integrated error signal magnitude causes the difference between the integrated error signal magnitude and the selected hysteresis band magnitude to be greater than the hysteresis signal magnitude, and which is equal in magnitude to the integrated error signal magnitude plus the selected hysteresis band magnitude whenever a decreasing integrated error signal magnitude causes the sum of the integrated error signal magnitude and the hysteresis band magnitude to be less than the magnitude of the hysteresis signal; and means for subtracting the hysteresis signal from the integrated error signal and providing a hysteresis limited integrated error signal for controlling a second independent variable which is thereby limited in responsiveness to small signal variations of the integrated error signal.

4. The apparatus of claim 3, further comprising:

a second hysteresis transfer function, similar in function to the hysteresis transfer function of claim 3 except having a larger magnitude hysteresis band, responsive to the integrated signal for providing a modified integrated error signal which causes the first independent variable to be responsive only to large signal variations of the integrated error signal.

* * * * *